United States Patent [19]

Kumbatovic

[11] Patent Number: 5,311,064
[45] Date of Patent: May 10, 1994

[54] EQUIPMENT TO EXTRACT OCEAN WAVE POWER

[76] Inventor: Bogumil Kumbatovic, 20-79 28th St., Long Island City, N.Y. 11105

[21] Appl. No.: 102,564

[22] Filed: Aug. 5, 1993

Related U.S. Application Data

[63] Continuation-in-part of Ser. No. 747,278, Aug. 19, 1991, abandoned.

[51] Int. Cl.⁵ .................... F03B 13/12; F03B 15/14
[52] U.S. Cl. .................................. 290/53; 290/42; 290/43; 290/54; 415/3.1; 415/4.1; 417/330
[58] Field of Search .............. 290/42, 43, 53, 54; 415/3.1, 4.1, 126; 417/330

[56] References Cited

U.S. PATENT DOCUMENTS

| | | | |
|---|---|---|---|
| 410,132 | 8/1989 | Witherell | 415/151 |
| 1,045,654 | 11/1912 | Willy | 60/497 |
| 1,202,657 | 10/1916 | Blevins | 415/7 |
| 1,289,533 | 12/1918 | Pelton | 290/53 |
| 1,439,416 | 12/1922 | Hess | 415/3.1 |
| 1,481,397 | 1/1924 | Tetetleni | 415/3.1 |
| 1,498,707 | 6/1924 | Wilcott | 416/85 |
| 3,928,771 | 12/1975 | Stroumsnes | 290/43 |
| 4,078,382 | 3/1978 | Ricafranco et al. | 290/53 |
| 4,137,005 | 1/1979 | Comstock | 290/53 |
| 4,563,591 | 1/1986 | Jones | 290/53 |
| 4,625,124 | 11/1986 | Ching-An | 290/53 |
| 4,717,831 | 1/1988 | Kikuchi | 290/53 |
| 4,843,249 | 6/1989 | Bussiere | 290/53 |

FOREIGN PATENT DOCUMENTS

| | | | |
|---|---|---|---|
| 2487918 | 2/1982 | France | 290/54 |
| 29527 | 3/1977 | Japan | 290/54 |
| 157069 | 9/1982 | Japan | 290/43 |

Primary Examiner—A. D. Pellinen
Assistant Examiner—Robert Lloyd Hoover
Attorney, Agent, or Firm—Morgan & Finnegan

[57] ABSTRACT

An apparatus for extracting ocean wave power includes slidable horizontal support means. A turbine unit is mounted on the slidable horizontal support means and is rotatably engaged with water flow. An extendable ram is coupled to the turbine unit at one end for lifting and lowering the turbine unit. The other end of the extendable ram is coupled to the slidable horizontal support means so that the turbine unit can incline and extend forwardly and backwardly concurrently with the lifting and lowering. Power generating mechanism is disposed at a fixed distance from the turbine unit for receiving the rotational movement of the turbine unit via a transmission mechanism.

19 Claims, 8 Drawing Sheets

EQUIPMENT TO EXTRACT OCEAN WAVE POWER

This application is a continuation-in-part of U.S. Ser. No. 07/747,278 filed Aug. 19, 1991, now abandoned.

FIELD OF THE INVENTION

The present invention relates to power generators and more specifically to a system for converting kinetic and potential energy of ocean waves into a rotational movement, and further generating electricity.

BACKGROUND OF THE INVENTION

Within the past several decades there have been many attempts to provide a system which is capable to harness the ocean wave energy and to produce useful energy like electricity.

Since the equipment for deriving ocean power has to be placed in the ocean for long periods of time, there is a need for a simple system which requires minimum parts and maintenance.

Furthermore, due to the fact that the water flow and its direction of impact is not constant and steady, the prior devices have not been able to derive the maximum wave energy in a very efficient manner.

A further complication that is encountered with the use of ocean wave power generators is bad weather conditions with very high tides and large maverick waves. Hence, means are necessary to protect the power generating system in such extreme weather conditions, and preferably be able to extract power even in such conditions.

OBJECT OF THE INVENTION

An object of the invention is to harness the ocean wave energy efficiently.

A further object of the invention is to dispose a power generating system in the most appropriate position to maximize the effect of ocean waves.

Yet another object of the invention is to set up a power generating system expeditiously and economically.

A still further object of the invention is to generate power from water flow while a power generating system is substantially submerged in the water.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invention, the foregoing and other objects are attained by providing a power extracting system having a support member disposed on a base which is fixedly attached on the ocean floor. The system further includes a slidable horizontal support disposed over the support member. A rotatable turbine unit is mounted on the slidable horizontal support such that the direction of water flow causes the rotation of the turbine. A mounting structure is disposed on the slidable horizontal support for holding the turbine unit. The mounting structure further includes an extendable ram coupled to the turbine unit at one end for lifting and lowering the turbine unit. The other end of the extendable ram is coupled to the slidable horizontal support so that the turbine unit can incline and extend forwardly and rearwardly upon movement of the slidable support. A power generating mechanism is disposed at a fixed distance from the turbine unit for receiving the rotational movement of the turbine unit via a transmission mechanism.

According to another aspect of the invention a wave agitator is fixedly disposed on the ocean floor in front of the turbine unit.

According to yet another aspect of the invention a single retaining wall is placed on an angle toward the direction of travelling waves to spin the waves to a higher potential and kinetic energy.

According to yet another aspect of the invention the power generating mechanism is separated from the turbine unit by a support rod. The extendable ram is pivotably connected at one end to an intermediate point of the support rod and at its other end is connected to a triangular frame structure which is fixedly disposed on the slidable horizontal support.

According to yet another aspect of the invention the power extracting system includes a housing having a base wall, first and second sidewalls, a front wall and a rear wall. The base of the housing is fixedly disposed on the waterbed. The front wall has an opening which is located distally from the base wall for providing an inlet for water flow into said housing. The rear wall of the housing has an opening proximally to said base wall for providing an outlet for the water flow from the housing. Disposed inside the housing is a conveniently shaped turbine unit which is fixedly supported by one or more of the surrounding walls. The turbine unit is rotatably engaged with the water flow. The turbine unit is further coupled to an extendable ram at one of its ends. The extendable ram can be appropriately extended or retracted so that the turbine unit is positioned for maximum power generation. The other end of the extendable ram is fixedly attached to the rear wall. A power generating mechanism is disposed at a fixed distance from the turbine unit for receiving the rotational movement of the turbine unit via a transmission mechanism. This power extracting system can be made portable when installed suitably on road wheels.

DETAILED DESCRIPTION OF THE DRAWINGS

Figure 1:
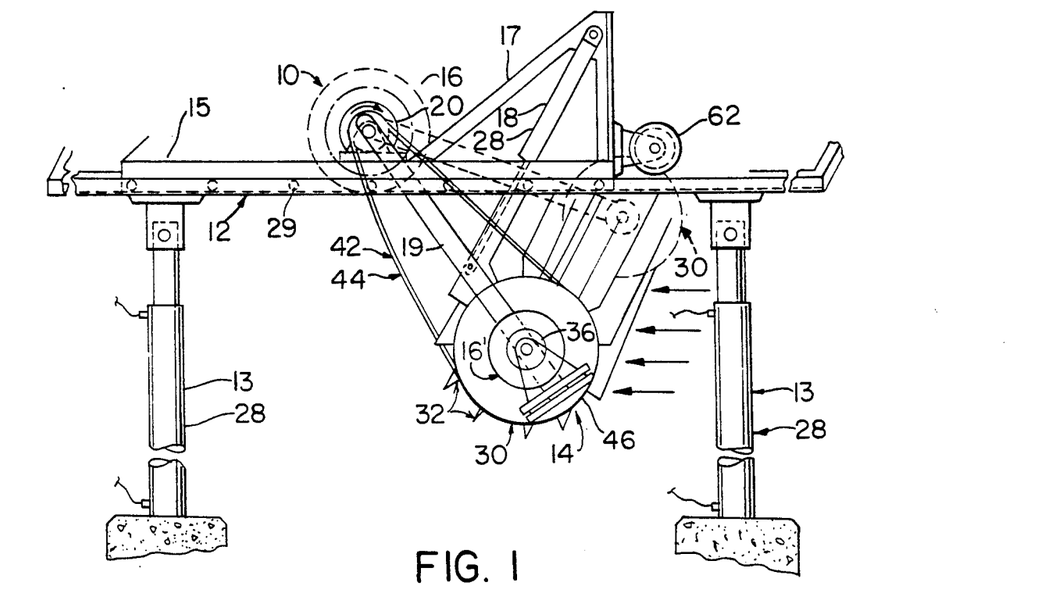
FIG. 1 illustrates the cross section of one embodiment of the present invention.

Referring to the drawings, in which like reference numerals demonstrate like elements, FIG. 1 illustrates a power generating apparatus 10 according to the present invention for generating useful power from the energy of ocean waves. The apparatus 10 includes a support member 12 which is supported by base 13. Base 13 is fixedly disposed on the ocean floor. A slidable horizontal support base 15 is disposed over the support member 12. The slidable horizontal support base 15 can be slid back and forth horizontally via roller 62. Roller 62 may be powered by a small electric motor. A turbine unit 14 is rotatably mounted to the support member 12 and is activated by the movement of the ocean waves.

According to one embodiment of the present invention, the system 10 includes a support rod 19 which interconnects the turbine unit 14 to the support member 12. An extendable ram, for example a piston-cylinder mechanism 18, is coupled to an intermediate point of rod 19 at one end and to a triangular support frame 17 at its other end. The piston-cylinder 18 is engaged with a hydraulically actuated system 28. The triangular support frame 17 is fixedly attached on the slidable base 15.

A power generating mechanism 16 is operatively connected to turbine unit 14, for generating useful power by rotation of turbine 14. The power generating mechanism may be an electric generator. In one embodiment of the present invention, the power generating mechanism 16 is fixedly disposed on the slidable support 15 and is separated from the turbine unit 14 by the support rod 19.

Turbine unit 14 further includes a water wheel 30 having external paddles 32, rotating with a main shaft 36. A transmission belt 42 interconnects the turbine unit 14 with the power generating mechanism 16. The belt 42 wraps around a pulley 46 provided on the perimeter of water wheel 30 from one end and around another pulley provided on a shaft wheel 20 of power generating mechanism 16 from the other end.

The support beams 13 may also be vertically extendable by the use of a powerful piston cylinder which is engaged with a hydraulically actuated system 28.

Consequently, the power extractor system 10 can support the turbine 14 such that the axis of rotation of the wheel 30 can always be disposed somewhat on the nominal surface of the body of water to receive the energy of the ocean waves with substantially maximum efficiency even in extreme wave conditions. Furthermore, in response to change in the water level, the height of the turbine unit 14 is adjusted by retracting the length of piston cylinder 18 which is coupled to triangular support frame 17. The height of the entire system 10 may also be adjusted by extendable beams 13.

In many instances, in order to more fully benefit from the kinetic energy of the ocean wave, it is beneficial to move the turbine unit 14 backwards or forwards. Thus the rotational frequency of the water wheel 30 can become in synchronism with various frequencies of ocean waves. As noted before, wheel 62 slides the slidable support base 15 to achieve the most desired response to the ocean waves.

It ca be appreciated by those skilled in the art that the extendable beams 13 may be designed to create coarse vertical movements, whereas piston-cylinder 18 which moves turbine unit 14 may be designed to provide a more accurate movement for fine tuning the height of the turbine in respect to the height of ocean waves.

Figure 2:
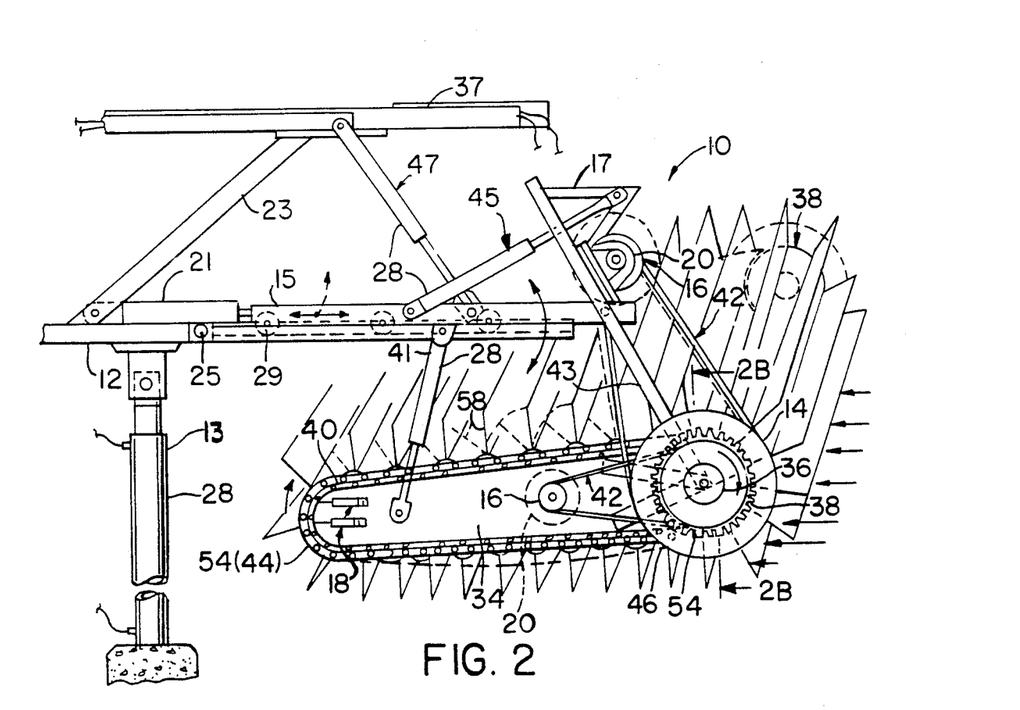
FIG. 2 illustrates another embodiment of the present invention.

FIG. 2 illustrates another embodiment of the present invention. Accordingly, the support structure 12 is disposed on four beams 13 not all shown. Beams 13 may be vertically extendable by a piston cylinder engaged with a hydraulically actuated system 28. The slidable horizontal support 15 is disposed on a plurality of free turning wheels 29. The slidable support 15 is attached to a piston-cylinder structure 21 for pulling and pushing the slidable support 15 along support member 12 on the free turning wheels 29.

Furthermore, turbine unit 14, according to another aspect of the invention may be an elongated water-tight tank 34. The tank 34 may have a rotating drum 38 having a main shaft 36. The tank 34 is surrounded externally by a wide chain 54 or a wide belt 44. Paddles 58 are mounted on the wide chain 54 or on a wide belt 44. Paddles 58 rotatably engage with the water flow in one direction only. Therefore, the paddles 58 provide a resistance to flow of water when they reach the lower portion of the tank 34, and provide no resistance to the water flow when they reach the upper portion of the tank 34. The rotating drum 38 is fixedly attached to a support lever 43 which holds the drum 38. An intermediate point of the support lever is pivotally coupled to the slidable horizontal support 15. A power generating mechanism 16 and a triangular support frame 17 are fixedly disposed on the portion of the lever 43 located distally from the drum.

An extendable ram 45 is interconnected at one end to the triangular support frame 17 and at the other end to slidable horizontal support 15. The extendable ram 45 may be a piston-cylinder engaged with a hydraulically actuated system 28. Similarly a second extendable ram 41 is interconnected at one end to the portion of the tank 34 located distally from drum 38. The other end of extendable ram 41 is coupled to the slidable horizontal support 15. A horizontal support beam 37 is disposed distally from and in parallel with the support member 12. The horizontal support beam 37 is fixedly connected to support member 12 by a cross beam 23.

A further extendable ram 47 is interconnected between the horizontal support beam 37 at one end and the slidable horizontal base 15 at the other end.

Figure 2A:
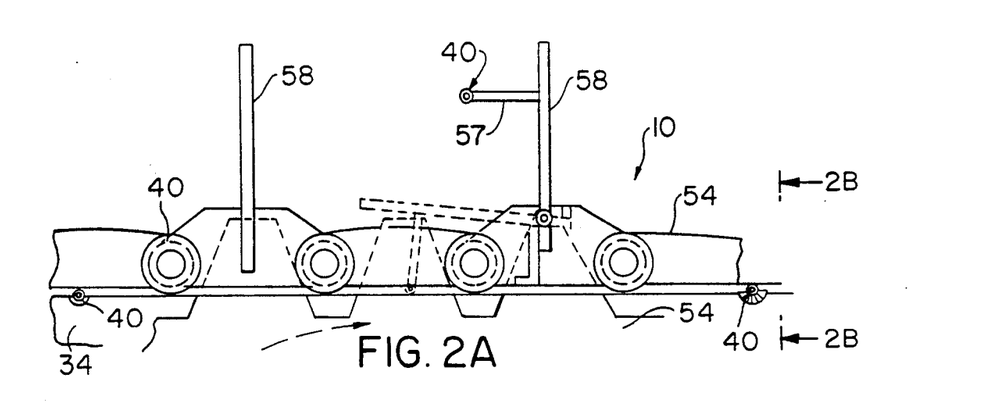
FIG. 2A illustrates a detailed view of the chain drive of FIG. 2.
Figure 2B:
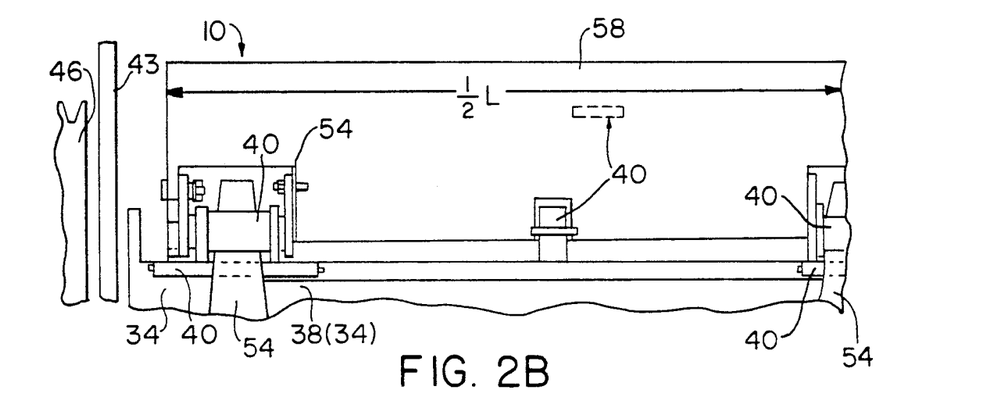
FIG. 2B illustrates a cross sectional view along line 2B—2B of FIGS. 2 and 2A.
Figure 2C:
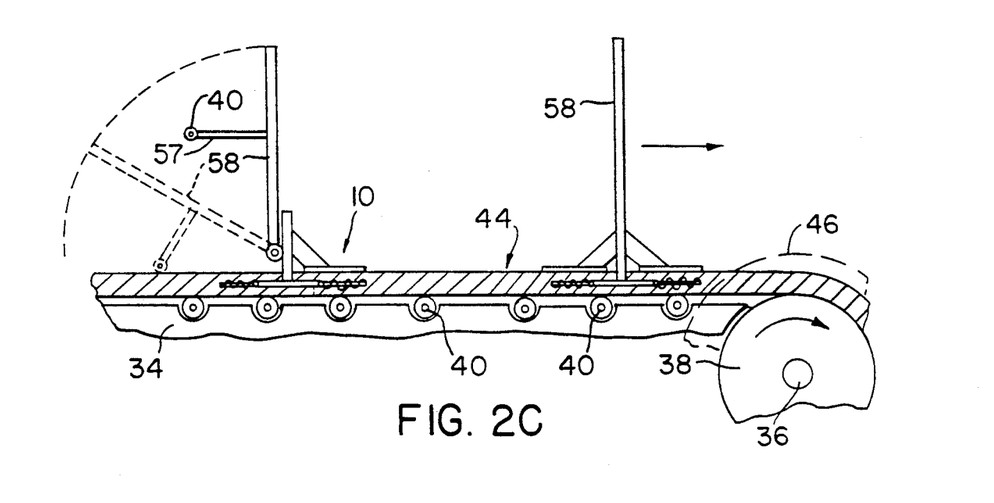
FIG. 2C illustrates a cross sectional view similar to FIG. 2A with belt drives instead.

FIGS. 2A–2C illustrate the operation of paddles 58, which are pivotable in a counterclock wise direction only. Thus as illustrated in FIG. 2 when the paddles 58 are in the lower portion of tank 34, the water flow impacts the paddles in the clockwise direction and the paddles cannot pivot. However, when the paddles 58 are in the upper portion of tank 34, the water flow impacts the paddles in a counterclock wise direction and the paddles pivot to provide minimum resistance to the water flow. Each paddle 58 may have cross branch 57 with a roller 40 at its end. Thus the wide chain drive 54 o the wide belt drive with paddles 58 will move easily around the tank 34 and over the free turning rollers 40 to drive the rotating drum 38, which in turn will drive the generating mechanism 16.

Figure 2D:
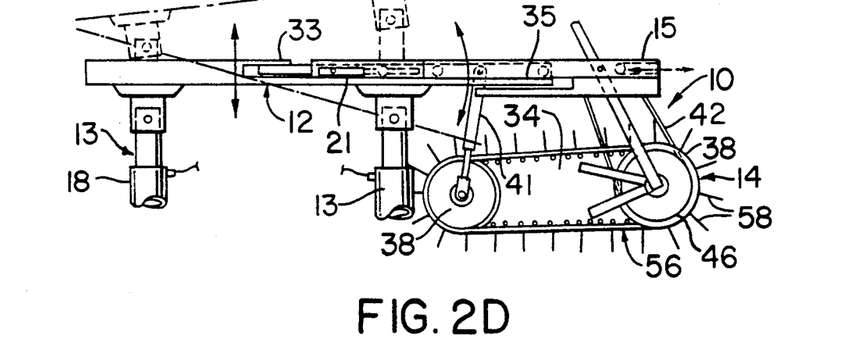
FIG. 2D illustrates another embodiment of the present invention.

FIG. 2D illustrates another embodiment of the invention. Accordingly the power generating system 10 includes front and rear support beams 13. Front and rear beams 13 may be independently extendable in a vertical direction. The turbine unit 14 is mounted on support member 12 and slidable horizontal support 15 with a plurality of pivotal extendible rams. Slidable support 15 is coupled to support base 12 by lap joints 33 and 35. This allows for the movement of the slidable base 15 in a horizontal plane.

Figure 2E:
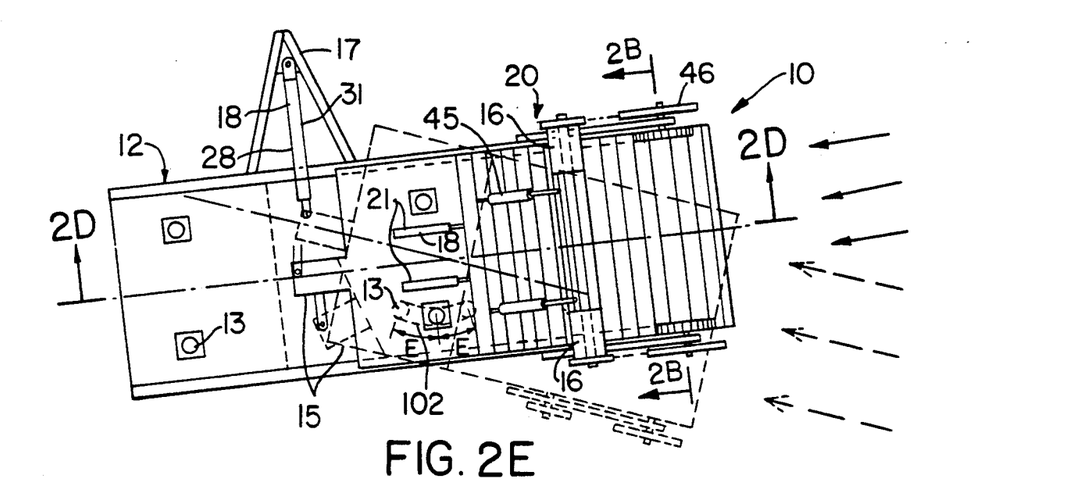
FIG. 2E represents the top view of FIG. 2D.

FIG. 2E is a top view diagram of FIG. 2D. As illustrated the slidable horizontal support 15 may be pivotally disposed on beams 13. An extendable ram 31 interconnects the slidable base 15 to a triangular frame 17. Thus by extracting or extending the ram 31, it is possible to partially rotate the slidable support 15 on a horizontal plane. A circular slot 102 on the slidable base 15 allows for the sliding movement of the base as it is rotating back and forth.

Figure 3:
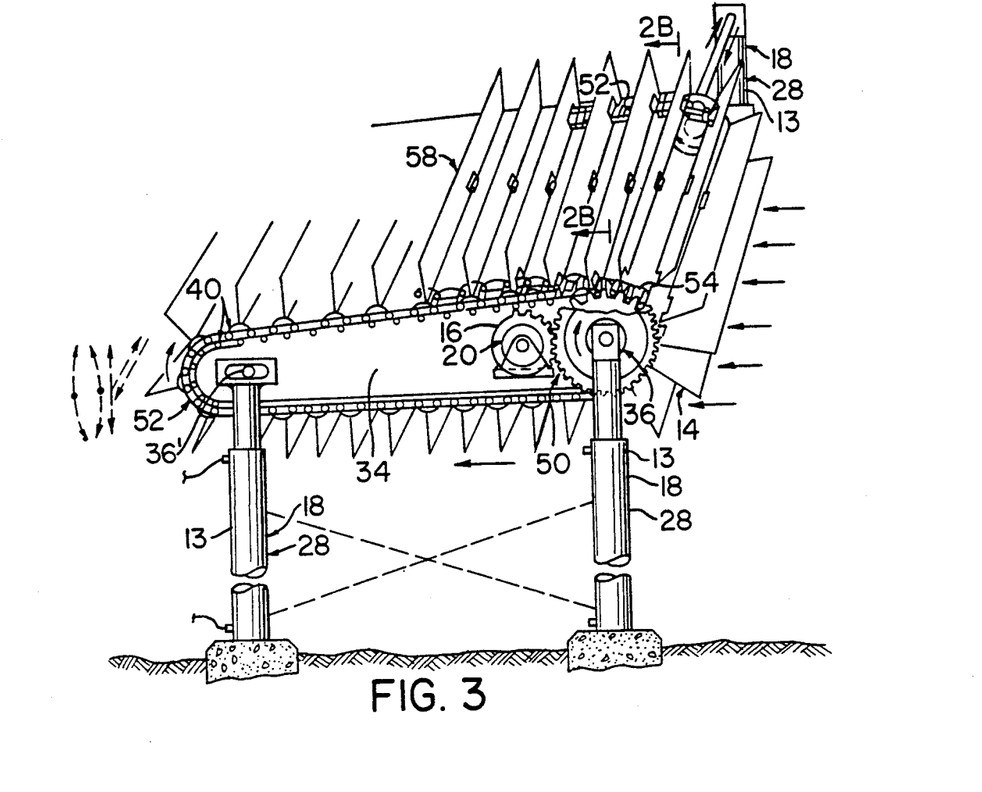
FIG. 3 illustrates another embodiment of the present invention.

FIG. 3 illustrates another embodiment of the invention. Accordingly main shaft 36 may be designed to be longer than the width of the tank 34 to allow side-way movement of the tank along the main shaft 36. Support beams 13 may be independently extendable in the vertical direction. The power generating mechanism 16 may be rotated by utilizing a gear mechanism 50. The power generating mechanism 16 may be mounted inside the water tight tank 34. A transmission gear 50 interconnects the turbine unit 14 with power generating mechanism 16.

Figure 4:
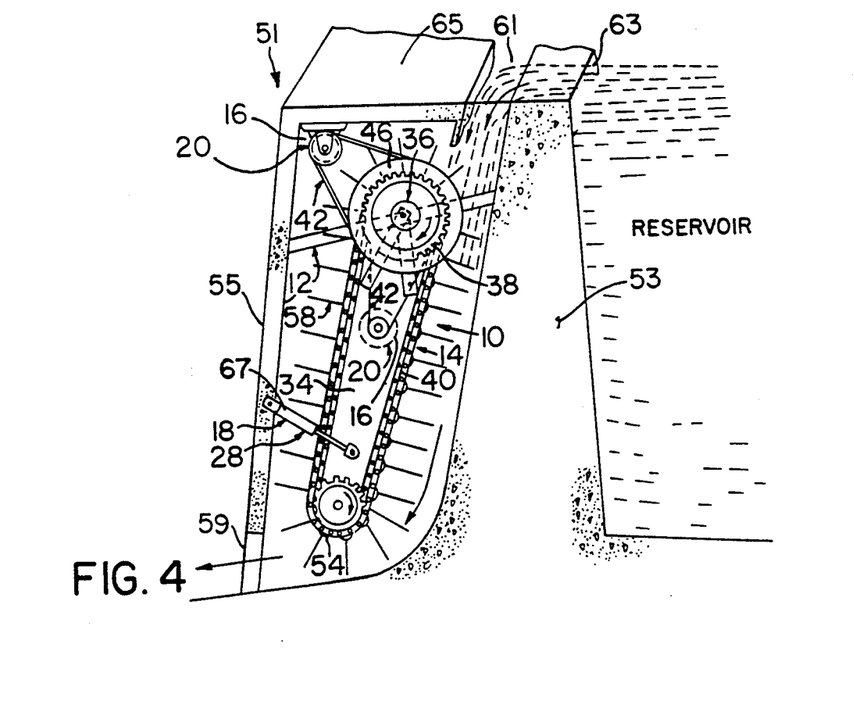
FIG. 4 illustrates still another embodiment of the present invention, with the power generating unit enclosed in a housing.

FIG. 4 illustrates another embodiment of the present invention. Accordingly a housing 51 may be provided to enclose the power generating system 10. The front wall 53 of housing 51 may be a concrete wall of a river or a lake dam vertically imbedded on the floor. Top wall 65 of the housing has an opening 61 for allowing an in-flow of water into the housing. The front wall 53 may also have an inlet 63 to provide water flow power for the generating system 10. Rear wall 55 has also an opening to provide an outlet 59 for the water flowing out of the housing. Turbine 14 is mounted on support members 12. Both ends of support member 12 are extended into front and rear walls of housing 51. The generating mechanism 16 may be disposed on the internal side of the top wall 65. The generating mechanism 16 may also be disposed externally to the housing, or inside the tank 34. An extendable ram 67 is pivotally attached to the portion of tank 34 distal from rotating drum 38, at one end and to the rear wall 55 at its other end. It can be appreciated by those skilled in the art that the power generating system disclosed in the other embodiments of this invention maybe adapted to be disposed in housing 51. This includes the systems of FIGS. 1, 2, 3, 5 and 6.

Figure 5:
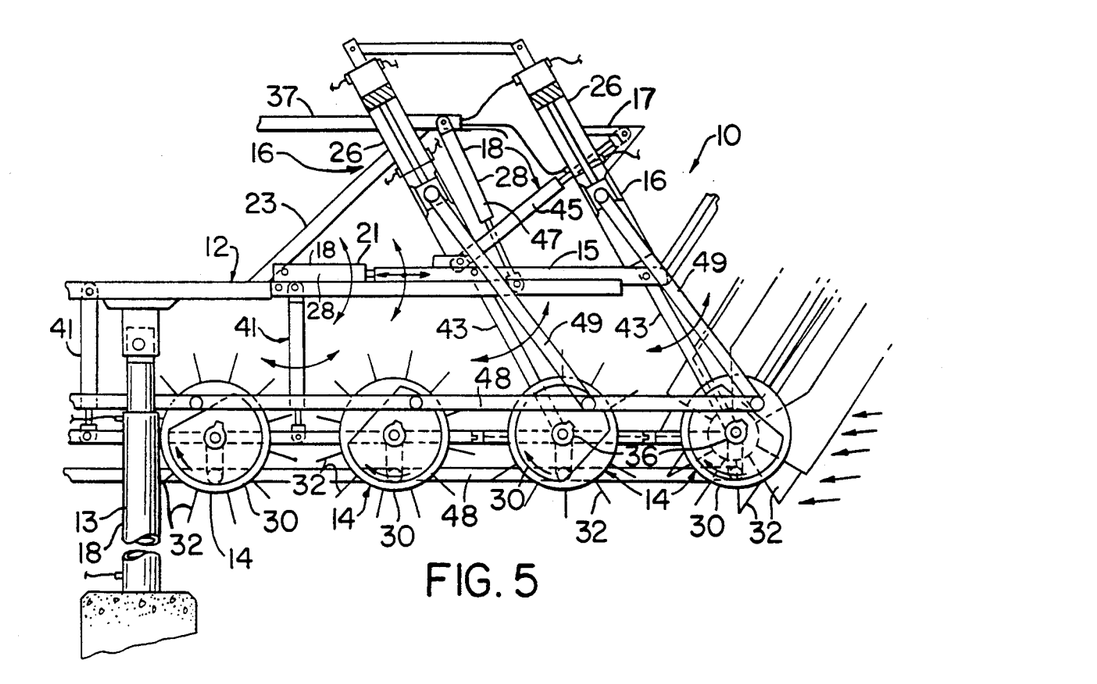
FIG. 5 illustrates another embodiment of the invention, with a plurality of turbine units providing power to a water or air pump.
Figure 6:
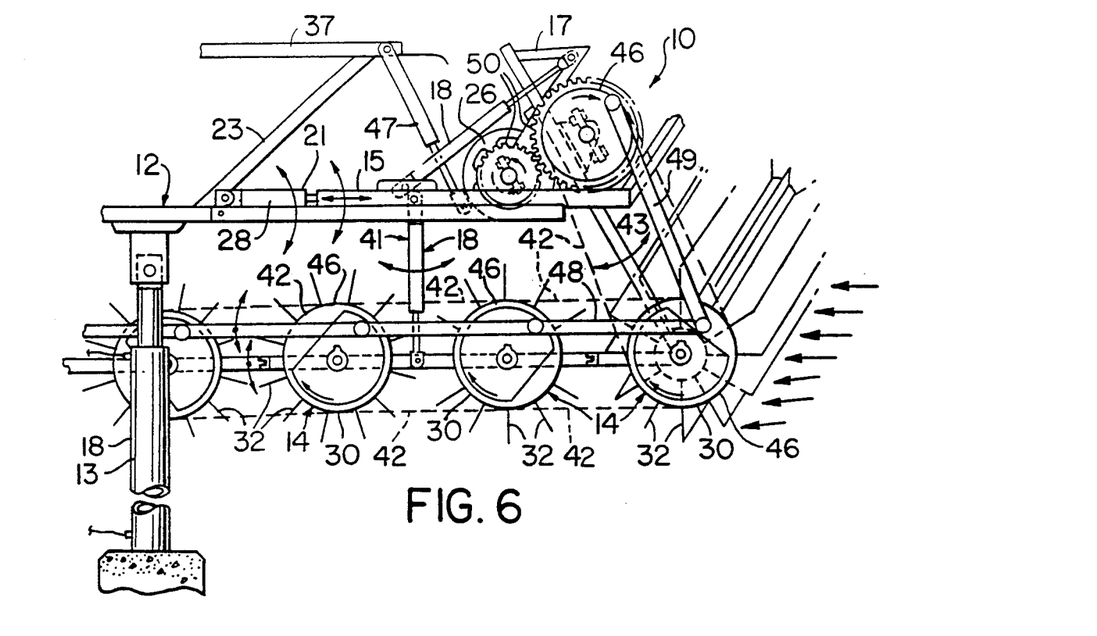
FIG. 6 illustrates a further embodiment of the present invention using a combination of crank shaft rods and belts for the transmission mechanism.

FIGS. 5 and 6 illustrate other embodiments of the present invention, wherein a plurality of turbines 14 may be engaged rotatably with the water flow. FIG. 5 illustrates water pumps 26 which are operable by crankshaft drives 48. Accordingly, horizontal crankshaft drives 48 are coupled to the rotating members of turbines 14, and vertical crankshaft drives 49 are coupled to horizontal crankshaft drives 48 at one end and to waterpump 26 at the other end. Thus, the rotating movement of turbines 14 may be translated to up and down or circular movement of water pump 26.

Figure 7:
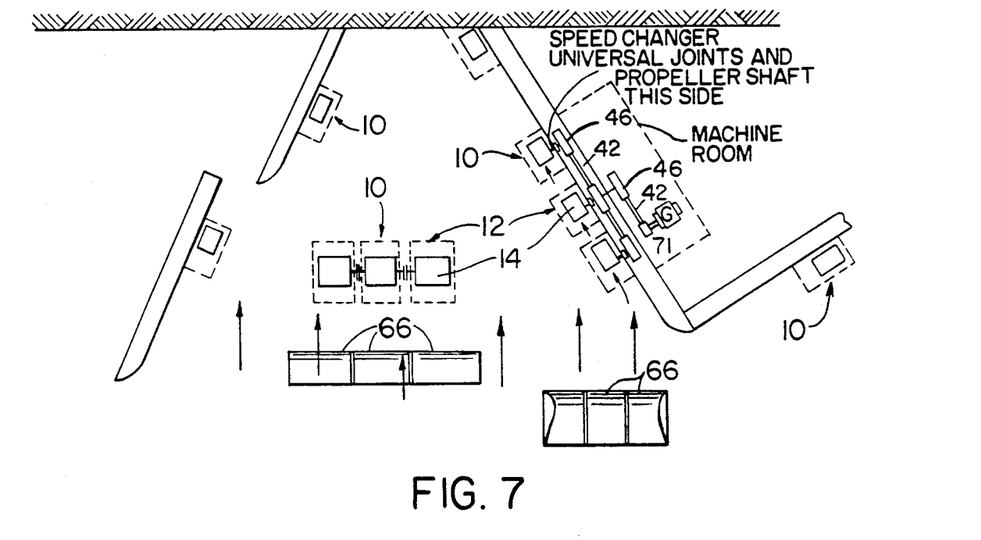
FIG. 7 illustrates a power generating plant in accordance with the present invention.

FIG. 7 illustrates a power generating plant utilizing a plurality of power generating systems 10. Individual power generating systems 10 are each strategically located within a predefined area of the ocean, preferably in the shallow regions. The electricity generated by each unit 10 is then gathered in the machine room 71. In order to increase the kinetic effect of the waves impacting on the turbines 14, wave agitators 66 are installed on the ocean floor in the vicinity of the frontal portion of turbines 14. Wave agitators 66 could be any kind of a sea-bottom configuration made of steel or pre-cast concrete or a build up of sand and pebbles. The configuration may be in the form of an underwater hill or cylindrical volume, having a size sufficiently suitable for increasing the wave power.

Figure 8:
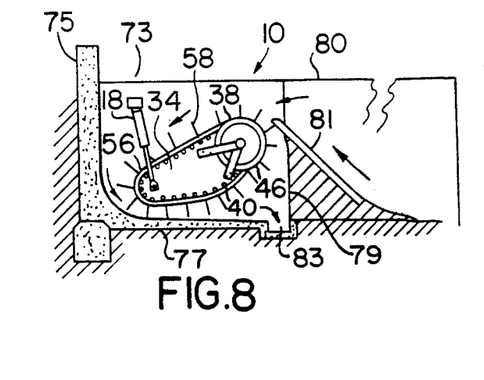
FIG. 8 illustrates still another embodiment of the present invention.
Figure 9:
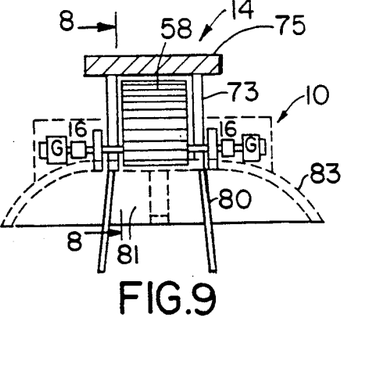
FIG. 9 illustrates the top view of the embodiment of FIG. 8.

FIGS. 8 and 9 illustrate another embodiment of the invention. Accordingly a housing 73, having rear wall 75, base wall 77, front wall 79 and two extended side walls 80, is provided for enclosing the power generating system 10. A ramp 81 is disposed on the front wall 79 for guiding the waves to the turbine 14. The base wall 77 has an opening 83 serving as an outlet for the water that flows out of the housing 73. Housing 73 may have two outward extended side walls 80 on predetermined angles to capture more of the incoming water.

Figure 10:
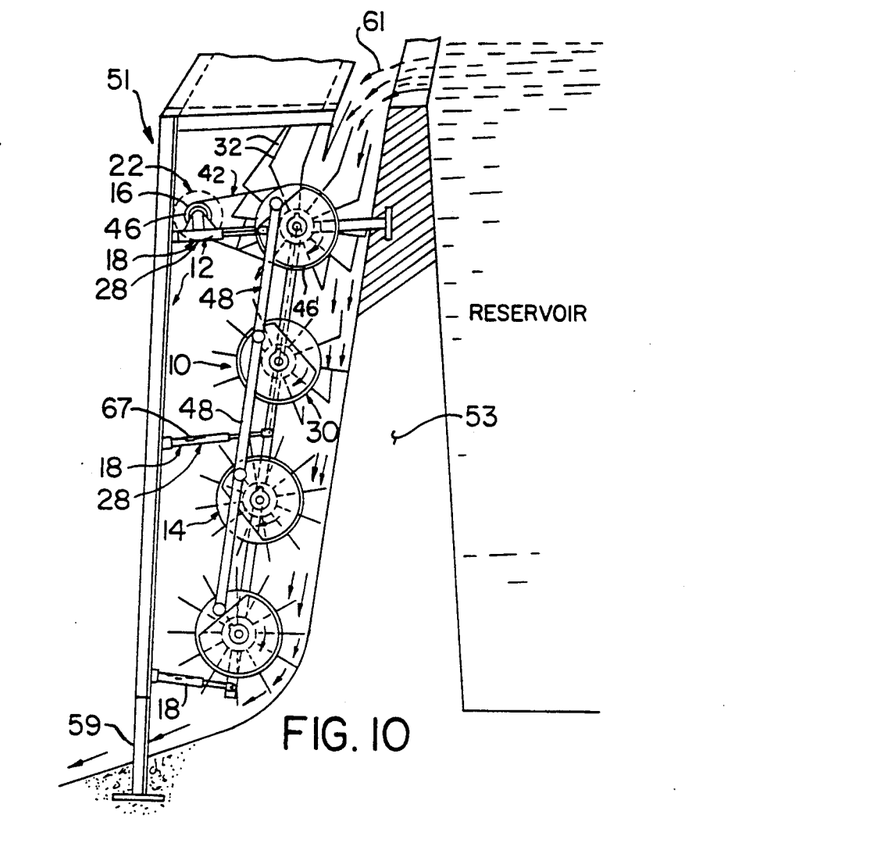
FIG. 10 illustrates still another embodiment of the present invention, with a plurality of turbine units enclosed in a housing.

FIG. 10 illustrates another embodiment of the invention which has the same housing arrangement as the system illustrated in FIG. 4. A plurality of turbine units 14 rotate in cohesion via a crankshaft drive 48.

Figure 11:
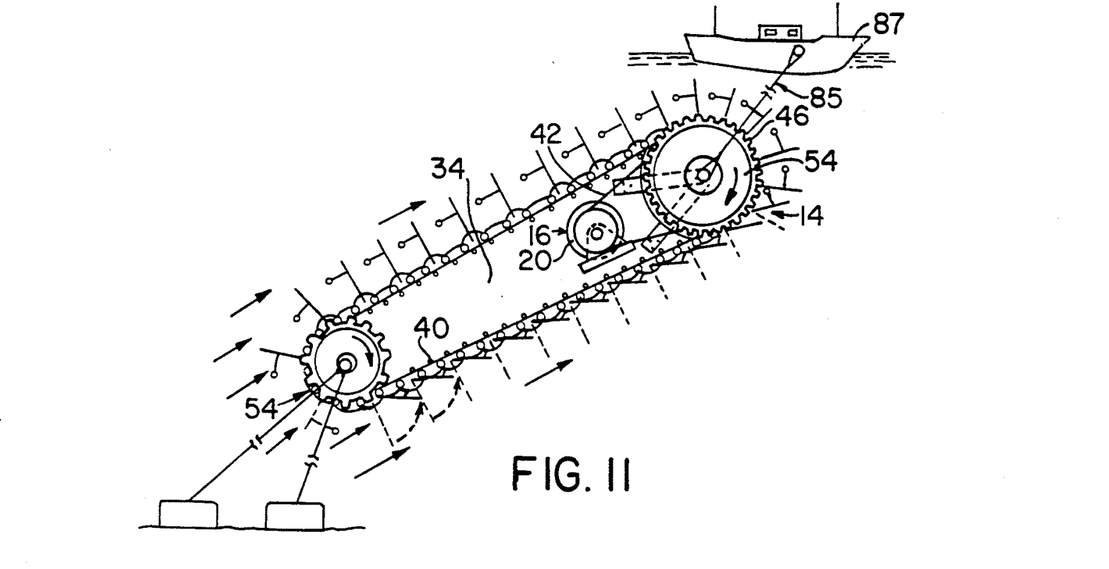
FIG. 11 illustrates another embodiment of the invention with a turbine unit immersed in the deep water currents supported by a floating vessel and anchors.

FIG. 11 illustrates another embodiment of the invention which utilizes under water currents. One end of power generating system 10 which is submerged in the water is coupled by a tie rope 85 to a vessel 87. The other end of power generating system 10 is coupled by two tie ropes which are connected to two heavy concrete blocks or anchors as support bases disposed on the ocean floor. Turbine unit 14 rotates along the direction of water flow. The arrangement illustrated in FIG. 11 allows for a portable power generating system with minimal installation costs. As mentioned earlier, the power generating mechanism 16 may be installed inside the tank 34 and is driven either by a belt 42 or a gear mechanism 50. The electric current is transported by an underwater cable to the ship or to the shore. This turbine unit employs two chain wheels 54 at each end. The underside paddles 58 provide the least resistance to passing underwater current in one designated direction while providing maximum resistance in the other direction.

Figure 12:
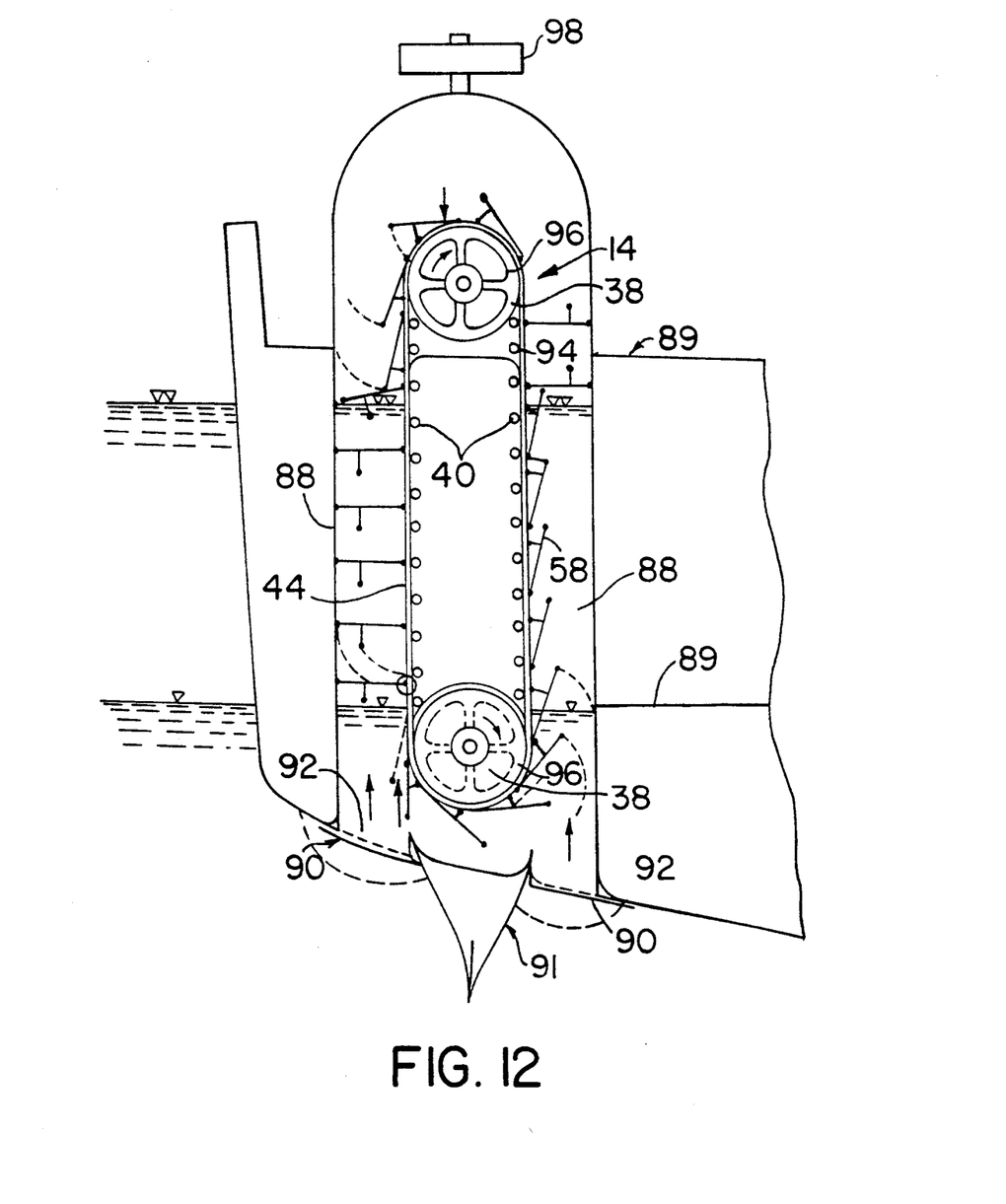
FIG. 12 illustrates still another embodiment of the invention with a turbine unit installed in an ocean ship.

FIG. 12 illustrates still another embodiment of the invention which can use a similar turbine unit as the one shown in FIG. 11 by being installed in a vertical shaft 88 of an ocean ship. As the ship rocks on waves the rushing water fluctuations inside the vertical shaft turns the turbine unit 14 only in clock wise direction to produce a useful power. The paddles 58 are installed on the wide belt 94 acting together with a belt wheel or pulley 96 on each end of the shaft and are pivotable in counter clockwise direction. The paddles 58 of the turbine unit 14 is rotatably engaged in sequence with the up and down waterflow on both sides of the turbine. The power generating mechanism 16, may be installed outside of the vertical shaft 88 on the upper or bottom deck 89 of the ocean ship. An air releasing device 98 is provided on top of the turbine shaft. Furthermore, two openings 92 with sliding door 90 and a plunger 91 are provided at the bottom of the shaft.

Thus the system according to the present invention advantageously permits optimum use of wave power in various situations. Remarkably, the system as described is capable of providing useful power from water waves by using flexible support structures. This flexibility provides appropriate positioning for the system to maximize the generated power and engage with maveric waves in all weather conditions by adjusting height optimally. It can also be appreciated by those skilled in the art that the process generating system of the present invention may be designed as a portable system carried on wheels from one location to the other.

The invention in its broader aspects therefore, is not limited to the specific embodiment herein shown and described, but departures may be made therefrom within the scope of the accompanying claims without departing from the principles of the invention and without sacrificing its chief advantages.

I claim:

1. An apparatus for extracting ocean wave power comprising:
   a support member disposed on a base, said base being fixedly attached to the ocean floor;
   a slidable horizontal support means disposed over said support member;
   a turbine unit mounted on said slidable horizontal support means and rotatably engaged with water flow;
   wherein said turbine unit is attached to a longitudinal supporting lever at one end, an intermediate point of said lever being pivotally connected to said slidable horizontal support means, the portion of said lever distal to said turbine unit being attached to said extendable ram by way of a triangular frame structure;
   mounting means disposed on said slidable horizontal support means for holding said turbine unit, said mounting means further comprising,
   extendable ram coupled to said turbine unit at one end for lifting and lowering said turbine unit, the other end of said extendable ram coupled to said slidable horizontal support means so that said turbine unit can incline and extend forwardly and backwardly concurrently with said lifting and lowering upon movement of said slidable horizontal support means; and
   power generating mechanism disposed at a fixed distance from said turbine unit for receiving the rotational movement of said turbine unit via a transmission mechanism.

2. The invention according to claim 1, wherein said power generating mechanism is fixedly disposed on said slidable horizontal support means and is separated from said turbine unit by a support rod, said extendable ram being pivotally connected at one end to an intermediate point of said support rod and at its other end connected to a frame structure which is fixedly disposed on said slidable horizontal support means.

3. The invention according to claim 2, wherein said base comprise at least four supporting beams which are fixedly imbedded in the ocean floor.

4. The invention according to claim 3 wherein each pair of said supporting beams are extendable independently from the other pair.

5. The invention according to claim 4, wherein said slidable horizontal support means moves slidably via a plurality of free turning rollers on said support member back and forth in response to a motion mechanism attached to said mounting means.

6. The invention according to claim 5, wherein said turbine unit further comprises a plurality of water wheels externally surrounded by a plurality of paddles for engagement with the water flow such that said water wheels are interconnected by either a crank shaft or by a belt drive.

7. The invention according to claim 1, wherein said transmission mechanism is selected from the group consisting of a transmission belt, transmission chain, a transmission connecting rod and a transmission gear.

8. The invention according to claim 1, further comprising a wave agitator fixedly disposed on the ocean floor in front of said turbine unit.

9. The invention according to claim 1, further comprising a retaining wall disposed on an angle towards the direction of incoming waves to agitate the waves to a higher potential and kinetic energy.

10. The invention according to claim 1, wherein said turbine unit is an elongated water tight tank having a rotating drum rotatable around a main shaft, said tank being externally surrounded by a wide belt and provided with free turning rollers.

11. The invention according to claim 1 wherein said turbine unit is an elongated water tight tank having a rotating drum around a main shaft, said tank being externally surrounded by a wide chain.

12. The invention according to claim 1, wherein said turbine unit is an elongated water tight tank having a rotating drum at one end rotatable around a main shaft, said rotating drum being driven by a wide chain surrounding said tank, said supporting rod attached pivotally to a slidable horizontal supports means, the other end portion of said tank distal from said main shaft being supported by a second extendable ram also attached to said slidable horizontal support means.

13. The invention according to claim 12, wherein said support member is supported on two rear beams and two front beams, said slidable horizontal support means being pivoted rotatably over a horizontal plane and having a partially circular slot over at least one of said two front beams, such that said horizontal support means moves slidably along said circular slot and rotatably along said horizontal plane.

14. The invention according to claim 13, wherein each pair of said support beams are extendable independently from the other pair along a vertical axis.

15. A system for extracting water flow power comprising:
   a housing having a base wall, first and second sidewalls, a front wall and a rear wall, the base of said housing fixedly disposed on the water bed, said housing having an opening distally from said base wall for providing an inlet or water flow into said housing, said rear wall of said housing having an opening proximally to said base wall for providing an outlet for said water flow from said housing;
   a turbine unit disposed in said housing and fixedly supported by plurality of said walls, said turbine unit being rotatably engaged with said water flow;

an extendable ram coupled to said turbine unit at one end for positioning said turbine unit against said water flow, the other end of said extendable ram being fixedly attached to said rear wall; and power generating mechanism disposed at a fixed distance from said turbine unit for receiving the rotational movement of said turbine unit via a transmission means.

16. The system according to claim 15, wherein said power generating mechanism is fixedly disposed on a wall outside said housing.

17. The system according to claim 16, wherein said turbine unit is supported by a cross beam horizontally fixed across two opposing walls.

18. The system according to claim 15, wherein said turbine unit is a conveniently shaped water tight tank having a rotating drum rotatable with a main shaft, said tank being externally surrounded by a wide belt with paddles and provided with free turning rollers, said extendable ram being disposed distally from said rotating drum.

19. A system for extracting water flow power inside a ship, said system comprising:

a housing within said ship having an opening at its base for receiving water into said housing;

a turbine unit attached within said housing further comprising a water-tight tank having a rotating drum with a main shaft, said tank being externally surrounded by a wide belt assembly provided with free turning rollers, said wide belt assembly having paddles providing resistance to flow of water in one direction when water flows upwardly inside the housing and providing resistance in the opposite direction when water flows downwardly inside the housing said wide belt assembly being rotatably engaged with the water fluctuation provided into said housing from said opening; and a power generating mechanism disposed for receiving the rotational movement of said turbine unit via a transmission mechanism.

* * * * *